United States Patent
Pacini et al.

(10) Patent No.: US 10,739,169 B2
(45) Date of Patent: Aug. 11, 2020

(54) FLAT PROFILE OPTICAL FIBER CABLE FOR DISTRIBUTED SENSING APPLICATIONS

(71) Applicant: OFS Fitel, LLC, Norcross, GA (US)

(72) Inventors: John E Pacini, Glastonbury, CT (US); Brian Violette, East Granby, CT (US); Jacob Ulrik Petersen, Tune (DK)

(73) Assignee: OFS FITEL, LLC, Norcross, GA (US)

( * ) Notice: Subject to any disclaimer, the term of this patent is extended or adjusted under 35 U.S.C. 154(b) by 197 days.

(21) Appl. No.: 15/793,423

(22) Filed: Oct. 25, 2017

(65) Prior Publication Data

US 2018/0274954 A1     Sep. 27, 2018

Related U.S. Application Data

(60) Provisional application No. 62/475,532, filed on Mar. 23, 2017.

(51) Int. Cl.
*G01D 5/353*     (2006.01)
*G02B 6/44*      (2006.01)

(52) U.S. Cl.
CPC ..... *G01D 5/35364* (2013.01); *G01D 5/35374* (2013.01); *G02B 6/443* (2013.01); *G02B 6/4415* (2013.01); *G02B 6/4433* (2013.01); *G01D 5/3539* (2013.01)

(58) Field of Classification Search
CPC ... G01D 5/35364; G02B 6/4415; G02B 6/443
See application file for complete search history.

(56) References Cited

U.S. PATENT DOCUMENTS

| | | | |
|---|---|---|---|
| 5,673,352 A * | 9/1997 | Bauer | G02B 6/4403 385/103 |
| 6,813,403 B2 | 11/2004 | Tennyson | |
| 7,162,130 B2 | 1/2007 | Castellani et al. | |
| 7,538,883 B2 | 5/2009 | Froggatt | |
| 8,149,394 B2 | 4/2012 | Burchardt et al. | |
| 8,374,473 B2 | 2/2013 | Weimann et al. | |
| 8,672,539 B2 | 3/2014 | Skinner | |
| 9,097,562 B2 | 8/2015 | Freitag et al. | |
| 9,244,009 B2 | 1/2016 | Handerek | |
| 9,255,836 B2 | 2/2016 | Taverner et al. | |
| 9,575,271 B2 | 2/2017 | Fuse | |
| 2003/0066356 A1 | 4/2003 | Kanellopoulos et al. | |
| 2006/0159407 A1* | 7/2006 | Kachmar | G02B 6/443 385/102 |

(Continued)

*Primary Examiner* — Georgia Y Epps
*Assistant Examiner* — Don J Williams
(74) *Attorney, Agent, or Firm* — Wendy W. Roba, Esq.

(57) ABSTRACT

A distributed sensing optical fiber cable is proposed. An optical fiber is positioned at the center of the cable and includes a core region, at least one cladding layer surrounding the core region, a protective coating covering the at least one cladding layer, and a tight buffer of elastomeric thermoplastic material disposed to surround the protective coating. The remainder of the cable structure includes a pair of strength members disposed longitudinally on either side of the optical fiber (the strength members formed of a glass-based, memory-less material) and a hard plastic jacket formed to encase the optical fiber and the pair of strength members, the plastic jacket preferably exhibiting an essentially rectangular profile.

23 Claims, 4 Drawing Sheets

(56) References Cited

U.S. PATENT DOCUMENTS

| | | | | |
|---|---|---|---|---|
| 2009/0245740 A1* | 10/2009 | Weimann | ............ | G02B 6/4433 |
| | | | | 385/107 |
| 2012/0099825 A1* | 4/2012 | Messer | ............... | G02B 6/4432 |
| | | | | 385/113 |
| 2012/0300807 A1* | 11/2012 | Freitag | .................. | G01D 5/353 |
| | | | | 374/161 |
| 2016/0169711 A1 | 6/2016 | Blakley et al. | | |

* cited by examiner

FLAT PROFILE OPTICAL FIBER CABLE FOR DISTRIBUTED SENSING APPLICATIONS

CROSS-REFERENCE TO RELATED APPLICATIONS

This application claims the benefit of U.S. Provisional Application Ser. No. 62/475,532, filed Mar. 23, 2017 and herein incorporated by reference.

TECHNICAL FIELD

The present invention relates to an optical fiber cable for distributed sensing applications and, more particularly, to an optical fiber cable utilizing a combination of a tight buffer for the sensing fiber and glass-based strength members (rods) within the cable structure.

BACKGROUND OF INVENTION

With recent technological developments, optical fibers can now move beyond the realm of voice and data transport to function as a sensor for measuring a variety of environmental conditions in a diverse number of applications, and harsh conditions, where conventional measurement systems are not practical.

Previously, discrete methods have been used to gather environmental data. These discrete methods use single-point sensors such as thermometers, resistance strain gauges, piezoelectric sensors, acoustic sensors, and the like (strategically, but discretely, located on or within the structure, thus leaving large areas or portions not covered) to monitor environment situations associated with structures. These structures may include, for example, bridges and buildings where there is a need to monitor structural integrity. Other structures include oil and gas wells, where downhole temperature and pressure readings are used to ensure that the well is operating properly. If these discrete, single-point sensors are not located within the region(s) of the structure where a problem arises, accurate and timely detection of an emergency condition cannot be ensured.

"Distributed" optical fiber-based sensors have been developed that are disposed alongside a structure (or within a borehole for well monitoring purposes), with changes in the characteristics of the light propagating along the fiber caused by the changes in its environment, analyzed to detect a variety of different problems by indicating changes in temperature, pressure, strain, etc. In any case, the distributed strain sensing (DSS) fiber-based cable must be sufficiently robust to withstand installation and handling, as well as any extreme environmental conditions after installation, while efficiently and accurately transferring the load stress due to dimensional changes of deformation of the sensing optical fiber. The cable sensor must not impart any stress related to installation, handling and/or extreme environmental conditions onto the sensing optical fiber, or the strain sensing characteristics of the sensor will be compromised.

Additionally, it is preferred that the cable itself retain no mechanical "memory" after bending, which may easily occur during installation. Such memory results in inaccurate strain and perhaps hysteresis in measurements. For the DSS cable to function and provide accurate, uniform and continuous strain measurements, there must be sufficient coupling of the sensing optical fiber to the cable jacket and the sensing cable strength elements.

SUMMARY OF THE INVENTION

The present disclosure relates to an optical fiber cable for distributed sensing applications and, more particularly, to an optical fiber cable utilizing a combination of a tight buffer for the sensing fiber and glass-based strength members (rods) within the cable structure to provide distributed sensing of environmental conditions.

Exemplary embodiments of the present invention relate to a fiber optic sensor cable comprising one or more optical fibers, each optical fiber comprising at least one core and cladding layer for guiding the light beam that is being used as the "sensing" signal. The sensor cable typically includes one or more coating layers disposed around the cladding layer to maintain the pristine properties of the optical glass after fabrication of the optical fiber. A tight buffer layer, preferably of an elastomeric thermoplastic material, is formed around the coated optical fiber, with glass-based strength members disposed longitudinally along either side of the fiber. An outer jacket of a high strength plastic completes the sensor cable configuration, covering the fiber and strength members.

The tight buffer is advantageous for distributed strain sensing (DSS) optical fiber cable embodiments, providing efficient coupling of strain between the strength members and the optical sensing fiber in the center of the structure. In distributed temperature sensing (DTS) and distributed acoustic sensing (DAS) embodiments, a tight buffer provides protection of the optical fiber from macro bending (e.g., extreme forces) during very small and/or tight bends of the cable.

The strength members are particularly formed of a glass-based material known to be "memory-less"; i.e., able to return to original form after being flexed or compressed. Many prior art cable structures utilized metallic strength members, which are not memory-less and have been found to result in inaccurate measurements of along a distributed sensing optical fiber cable.

One exemplary embodiment of the present invention takes the form of a distributed sensing optical fiber cable including a centrally-located fiber that performs the sensing. The central fiber itself includes a core region, at least one cladding layer surrounding the core region, a protective coating covering the at least one cladding layer, and a tight buffer of elastomeric thermoplastic material disposed to surround the protective coating. The remainder of the cable structure includes a pair of strength members disposed longitudinally on either side of the optical fiber (the strength members formed of a memory-less material) and a plastic jacket formed to encase the optical fiber and the pair of strength members, the plastic jacket exhibiting an essentially rectangular profile.

Other and further embodiments of the present invention will become apparent during the course of the following discussion and by reference to the accompanying drawings.

BRIEF DESCRIPTION OF DRAWINGS

Referring now to the drawings.

DETAILED DESCRIPTION OF THE INVENTION

The process of accurate detection of damage to engineering structures, as well as properly characterizing the type of damage, requires a sensor that provides continuous, distributed measurement of strain within the structure under evaluation. The typical engineering structures under analysis include, for example but not limited to, bridges and buildings and other infrastructures (for example, dams, wells, and the like) that may experience extreme events, such as earthquakes or blast loading. Obviously, it is important for the sensors used for this purpose to maintain their integrity during these extreme events.

In order to detect the irregularities or cracks within the dimensions of a few centimeters in the monitoring structures, this type of fiber-based distributed sensor may use a single mode fiber (or a polarization-maintaining (PM) optical fiber) in combination with a high resolution interrogator (such as, for example, a phase-sensitive Brillouin optical time domain reflectometer, BOTDR). Other specific types of OTDR systems include, but are not limited to, OTDR-R (OTDR-Raman), OBR (Optical Backscatter Reflectometer), where the OBR uses Rayleigh-based reflectometry), reflectometry using Bragg gratings, interferometric metrology, and polarimetric metrology.

Figure 1:
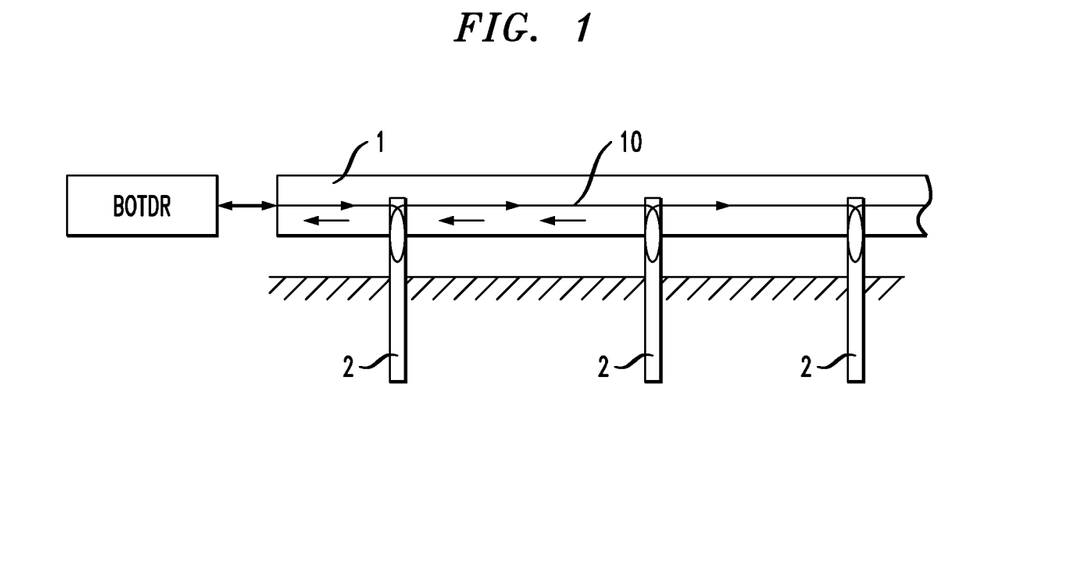
FIG. 1 is a simplified diagram of a structural system within which a sensor cable of the present invention may be deployed.

FIG. 1 is a simplified diagram of a structure within which a distributed sensing optical fiber cable may be used. Here, the structure is defined as a bridge, including a lateral span 1 and a plurality of columnar supports 2. A distributed sensing cable 10, formed in accordance with exemplary embodiments of the present invention, is shown as disposed across the length of span 1. It is to be understood that distributed sensing cable 10 may also be formed within the material of span 1 during manufacture. As shown, a portion of the distributed sensing cable 10 is disposed along columnar supports 2.

An "in situ" (i.e., "in place") measurement of the strain experienced by span 1 and/or columns 2 is performed by using a phase-sensitive BOTDR, as described above. Changes in structural strain along the cable will be transferred into the core fiber region of the cable, resulting in stress-induced shift in the Brillouin frequency of the fiber. These changes in Brillouin frequency will allow accurate measures of strain when evaluated in conjunction with a predetermined "master curve" of frequency shift-strain relation.

Figure 2:
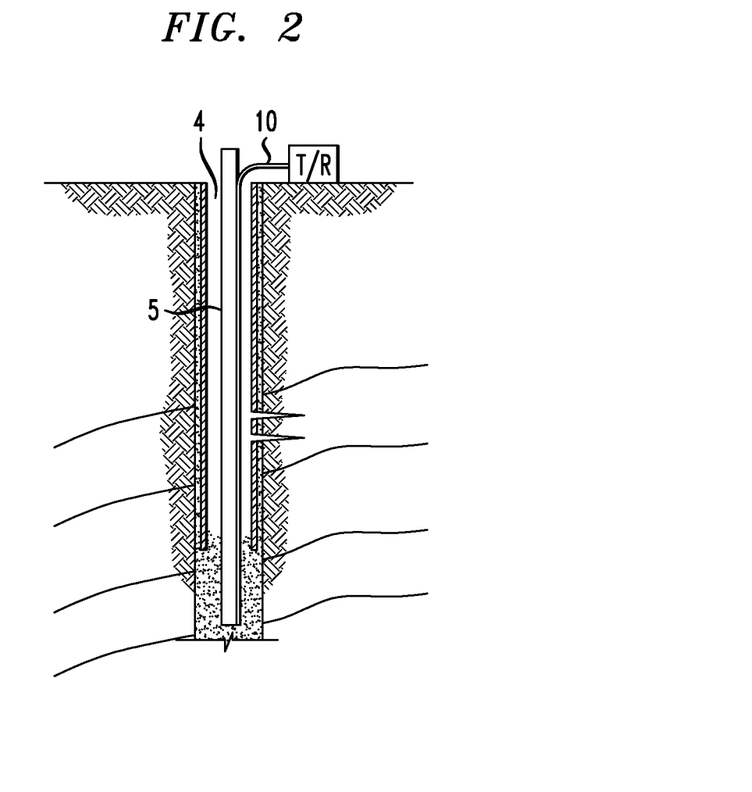
FIG. 2 is a simplified diagram of a downhole wellbore within which a sensor cable of the present invention may be deployed.

Sensing changes in temperature and/or acoustic conditions within a wellbore, pipeline, or other type of conduit/tube may also be provided by using a distributed sensing optical fiber cable formed in accordance with exemplary embodiments of the present invention. FIG. 2 illustrates an exemplary arrangement where distributed sensing cable 10 is disposed down a wellbore 4, alongside a pipeline 5. Properties of downhole formations surrounding or otherwise adjacent to the wellbore may be monitored over time based on acoustic sensing. Additionally, oil production (for example) can be monitored by sensing the temperature (as well as temperature changes) along the pipeline. Moreover, off-shore oil pipelines may utilize distributed sensors to monitor environmental conditions associated with production and transport of the oil.

With this basic understanding of exemplary environments where a distributed sensing optical fiber cable of the present invention may be used, the cable itself will now be described in detail.

Figure 3:
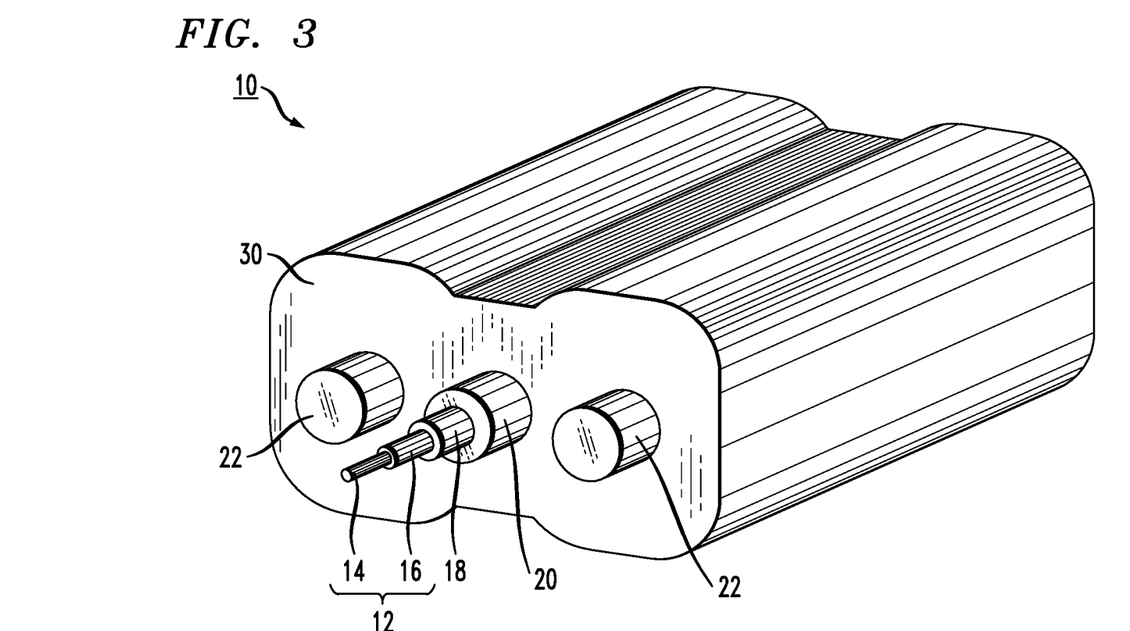
FIG. 3 is a perspective view of a first exemplary embodiment of the sensor cable.

FIG. 3 is a perspective cut-through view of a first exemplary embodiment of a distributed sensing cable 10 (referred to hereinafter as simply "sensor cable 10") formed in accordance with one or more embodiments of the present invention. As shown, sensor cable 10 is relatively rectangular in overall form so that it can be easily bonded to the outside of a structure (such as across the surface of span 1, as shown in FIG. 1 or alongside a pipeline, as shown in FIG. 2), or even formed within a concrete structure during fabrication. By being flat, it will resist twisting during installation and afterward is more likely to remain along the axis of its installation.

In this embodiment, sensor cable 10 is formed to comprise a single, centrally-located optical fiber 12, having a core region 14 surrounded by a cladding layer 16 and a coating 18. In accordance with exemplary embodiments of the present invention, a "tight" buffer layer 20 is disposed to envelope optical fiber 12. In a preferred embodiment, tight buffer layer 20 comprises an elastomeric thermoplastic material that is disposed to surround coating 18 of optical fiber 12. Elastomeric thermoplastic materials comprise copolymers or a physical mix of polymers (usually a plastic and a rubber) which consist of materials with both thermoplastic and elastomeric properties, exhibiting the advantages typical of both rubbery and plastic materials. In particular, elastomeric thermoplastic materials are characterized by their ability to be stretched to moderate elongations and, upon removal of the stress, return to a configuration essentially the same as their original shape, providing a considerable range of movement while maintaining a long lifespan.

It is to be understood that the use of a "tight" buffer layer is critical for distributed strain sensing optical fiber cable embodiments of the present invention, where there is a need to efficiently transfer strain from surrounding strength members (described in detail below) to optical fiber 12 in the center of sensor cable 10. Prior art distributed strain sensing cables often used a less-expensive "semi-tight" buffer to surround the fiber, which has been found to lead to inaccuracies in the transfer of forces between the strength members and the optical fiber.

For both temperature and acoustic sensing cables, the use of a tight, elastomeric thermoplastic buffer around the optical fiber provides protection of the internal optical fiber 12 from macro bending (e.g., extreme forces) as may occur during very small or tight bends of the cable.

Common outer diameters for tight-buffered optical fiber 12 range from 500 to 900 μm, although other diameters are possible. Preferred materials used in the formation of tight buffer layer 20 comprise thermoplastic material such as polyvinyl chloride (PVC), polyethylene (PE), mineral-filled flame-retardant PE, nylon, polyether ether ketone (PEEK), and thermoplastic elastomers (TPE) such as polyester elastomer, polyurethane (PU), or polyethylene based elastomers, among others.

Also shown in the structure of sensor cable 10 is a pair of strength members 22. Strength members 22 comprise longitudinally-extending rods, with one rod disposed on either side of optical fiber 12. In accordance with one or more embodiments of the present invention, strength members 22 are critical in providing fully elastic and repeatable strain with flexibility, while exhibiting little or no detrimental memory. The latter quality is important when the sensor cable may be susceptible to bending, straining and stress during installation. In accordance with the teachings of the present invention, strength members 22 comprise a memoryless, glass-based material, such as epoxy/glass composite or solid silica glass, for example. These glass-based materials have been found to provide fully elastic and repeatable strain up to 2% elongation with flexibility. Glass-based strength members 22 exhibit little or no detrimental memory, which was often found with prior art metallic strength members. Moreover, the use of glass-based strength members also assures a kink-free installation process. Indeed, strength members 22 can also play a role in providing protection to optical fiber 12 against any crushing force it might experience during handling and installation.

In some embodiments of the present invention, optical fibers may be used as strength members 22. The inclusion of optical fibers allows for the inventive sensor cable to perform other functionality, for example to transmit additional optical sensing signals relative to changes in temperature and/or strain. Moreover, these fiber-based strength members may be utilized as one or more optical communication fibers within the sensor cable, providing a multi-purpose configuration where both information signals and sensing signals are transmitted along the cable.

Sensor cable 10 as shown in FIG. 3 further comprises an outer layer, defined as a plastic jacket 30. Plastic jacket 30 may be formed of, for example but not limited to, a high density polyethylene (HDPE), which is applied over the structure, ensuring sufficient bonding between all of the elements within the cable. In accordance with one or more embodiments of the present invention, HDPE is preferred for its toughness and ability to withstand being crushed. It is also resistant to temperature extremes and may withstand extended UV exposure, both of these environmental concerns associated with structure-based sensors. Other plastic materials that exhibit the desired properties of HDPE (e.g., toughness and ability to withstand being crushed) and may be used for plastic jacket 30 include, but are not limited to, nylon, PVDF, ETFE, or PFA, which may be used to meet additional environmental and mechanical requirements of the sensor installation and application.

Figure 4:
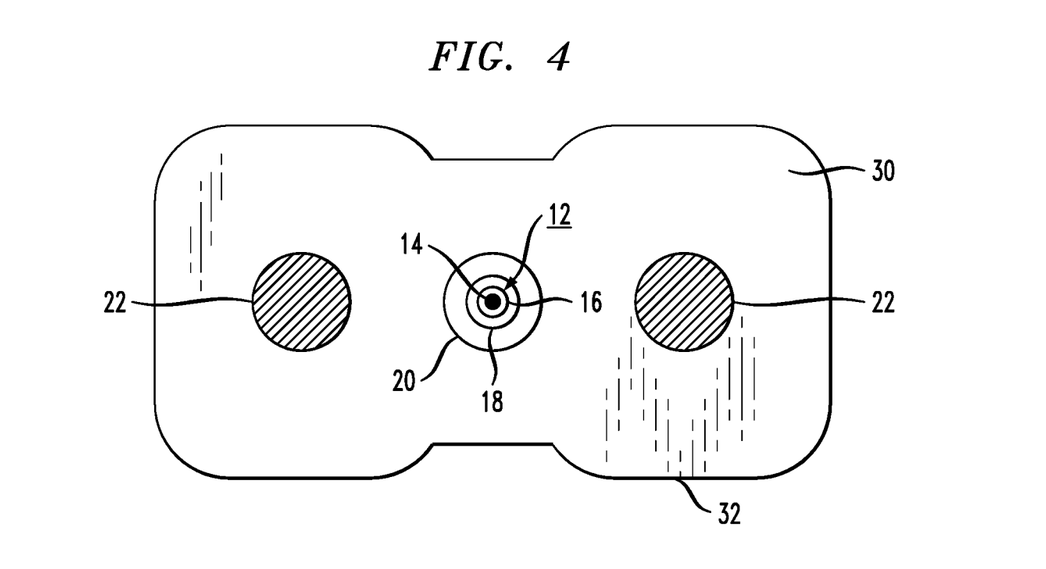
FIG. 4 is a cut-away end view of the embodiment of FIG. 3, illustrating location of strength members with respect to the sensing optical fiber, as well as the rectangular shape of the outer plastic jacket.

FIG. 4 is a cut-away view of sensor cable 10 of FIG. 3. The relative locations of strength members 22 with respect to optical fiber 12 are clearly shown. Also evident in this view is the relatively "flat" bottom surface 32 of outer jacket 30. As mentioned above, the use of a flat profile helps to ensure that the sensor cable will not twist or roll during or after installation. For a distributed strain sensing (DSS) cable application, it is important to reduce twist during handling and installation to an absolute minimum, since twist may introduce unwanted strain to the cable that may be transferred to the optical fiber inside the sensor cable.

Advantageously, the generally rectangular shape for the outer plastic jacket of the inventive sensor cable may also increase the contact area between the sensor cable and the engineering structure being studied, allowing for changes in dimension of the structure to be more efficiently transferred to the sensor case. Additionally, for distributed temperature sensing (DTS) applications, the large amount of surface area contact between the sensor cable and the structure (for example, a pipeline) is a critical advantage.

Figure 5:
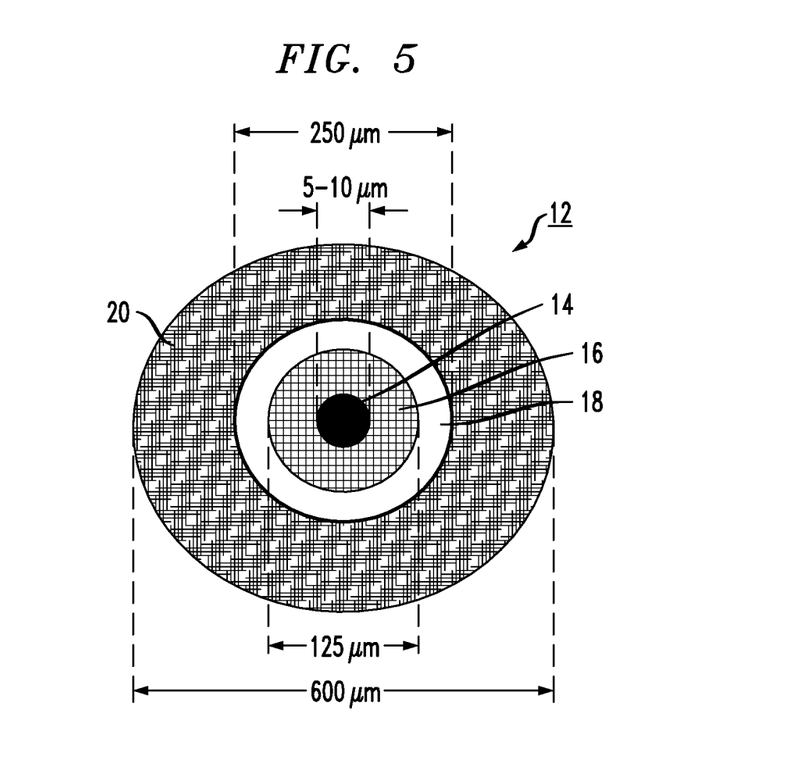
FIG. 5 is an enlarged view of the interior layers of a sensing optical fiber formed in accordance with the principles of the present invention.

FIG. 5 is an enlarged view of an exemplary optical fiber 12, used as the sensing fiber within cable structure 10 of FIG. 4. As mentioned above, optical fiber 12 may comprise any suitable type of fiber, including a single mode fiber or a polarization-maintaining (PM) optical fiber. When high resolution of strain values less than about 5 cm is required, PM optical fibers are often preferred, since stress-induced Brillouin frequency shift and change in phase of the light within PM fiber can be measured and used to evaluate distributed strain.

In one exemplary embodiment, optical fiber 12 may comprise a core region 14 having a diameter of on the order of 5-10 µm, with a 125 µm diameter cladding 16 and a 250 µm diameter coating layer 18. Tight buffer 20 is shown in this example as having a diameter on the order of about 600 µm.

Figure 6:
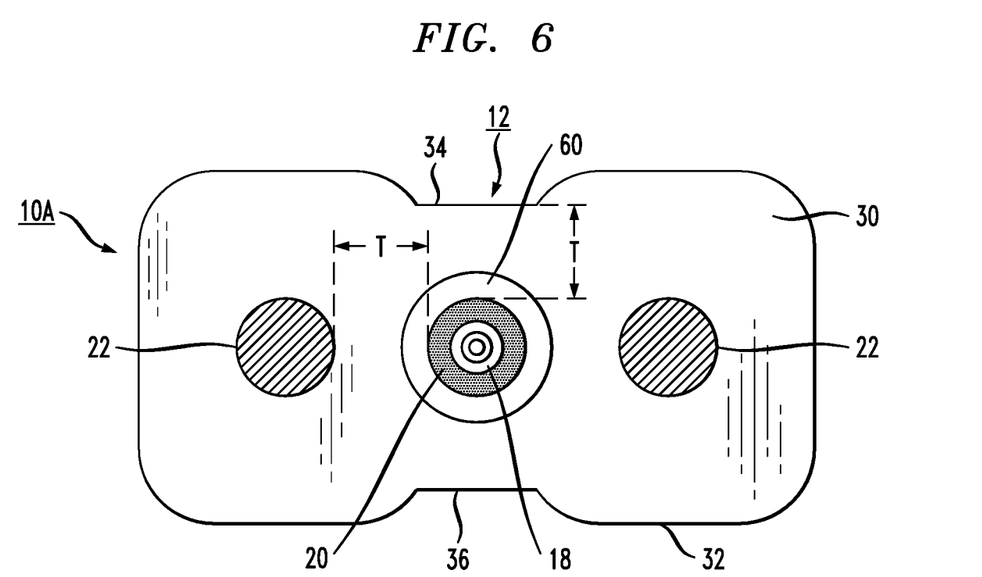
FIG. 6 is a cut-away end view of another embodiment of the present invention, particularly well-suited for temperature and acoustic sensing applications.

FIG. 6 illustrates another optical fiber sensor cable formed in accordance with the present invention, in this case a sensor cable 10A particularly well-suited for DTS and DAS applications. Here, tight buffered optical fiber 12 is disposed within a "loose tube buffer" 60, which is disposed within plastic jacket 30 and surrounded by glass-based stress rods 22 in similar fashion as described above. In this particular embodiment, the addition of the loose tube buffer helps isolate the effects of mechanical and environmental conditions on the cable from the tight-buffered sensing fiber at the center of the cable, allowing for accurate acoustic and temperature measurements to be obtained.

In the specific embodiment shown in FIG. 6, central regions of plastic jacket 30 comprise recessed areas 34 and 36. These areas are provided to reduce the amount of jacket material surrounding optical fiber 12, and improve the transfer of heat/sound to fiber 12. In this preferred embodiment, recessed areas 34 and 36 are sized to provide uniform thicknesses of jacket material 30 in the x- and y-directions as shown in FIG. 6. That is, recessed areas 34 and 36 are formed such that the thickness T of jacket 30 between tight buffer 20 and the cable exterior (y-direction) is the same as the thickness T of jacket 30 between tight buffer 20 and stress rods 22 (x-direction). It has been found that providing a uniform thickness allows for uniform cooling of the jacket's plastic material during the thermoplastic melt process (either extrusion or injection molding) used in formation of the jacket over the tight-buffered optical fiber. The provision of uniform cooling ensures that the plastic will undergo uniform shrinkage as it cools, thus reducing the possibility of creating non-uniform intrinsic stress on the tight-buffered optical fiber at the center of the cable. Subsequent to manufacture, the utilization of uniform jacket thickness in this area also provides for the uniform transfer of temperature to the optical fiber during temperature sensing applications.

The use of a slightly thicker plastic jacket in the outer regions of sensor cable 10 (in the vicinity of stress rods 20) is considered to provide additional protection to tight-buffered optical fiber 12 from compressive forces (i.e., protection from crushing).

A rectangular shape for plastic jacket 30 also ensures that the orientation of the cable can be monitored, since various axes of a rectangular sensor cable can be visually identified. This is in contrast, obviously, to a conventional circular cable where it is impossible to visually identify the optical axes. It is to be understood, however, that while a rectangular shape may be preferred for certain applications other cross-sectional shapes are possible, where a similar technical effect can be obtained.

By virtue of using memory-less strength members and an HDPE plastic jacket, the sensor cable of the present invention provides sufficient protection of the enclosed sensing fiber itself without affecting the actual ability of the fiber to repeatedly and reliably perform the necessary sensing operation. The use of a tight buffer provides a highly efficient transfer of stress from the surroundings to the core region of the fiber, while the plastic jacket reduces other interfering factors.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not different from the literal language of the claims, or if they include equivalent structural elements with insubstantial differences from the literal language of the claims.

What is claimed is:

1. A distributed sensing optical fiber cable comprising:
   an optical fiber including
   a core region;
   at least one cladding layer surrounding the core region;
   a protective coating covering the at least one cladding layer; and
   a tight buffer of elastomeric thermoplastic material disposed to surround the protective coating;
   a pair of strength member rods disposed longitudinally on either side of the optical fiber and spaced apart therefrom, the strength member rods formed of a memory-less material; and
   a plastic jacket formed to encase the optical fiber and encase each strength member rod of the pair of strength member rods, the plastic jacket having a profile including at least one relatively flat surface.

2. The distributed sensing cable of claim 1 wherein the plastic jacket comprises a material selected from the group consisting of: high density polyethylene (HDPE) material, Nylon, PVDF, ETFE, and PFA.

3. The distributed sensing cable of claim 1 wherein the pair of strength member rods are formed of a glass-based material.

4. The distributed sensing cable of claim 3 wherein the pair of strength member rods is formed of silica glass.

5. The distributed sensing cable of claim 3 wherein the pair of strength member rods is formed of an epoxy-glass composite.

6. The distributed sensing cable of claim 3 wherein the pair of strength member rods comprises at least one optical fiber.

7. The distributed sensing cable of claim 6 wherein the at least one optical fiber comprises a temperature sensing optical fiber.

8. The distributed sensing cable of claim 6 wherein the at least one optical fiber comprises a strain sensing optical fiber.

9. The distributed sensing cable of claim 6 wherein the at least one optical fiber comprises an optical communication fiber for transmitting optical data along the distributed sensing cable.

10. The distributed sensing cable of claim 1 wherein the tight buffer is formed of an elastomeric thermoplastic material selected from the group consisting of: polyvinyl chloride (PVC), polyethylene (PE), mineral-filled flame-retardant PE, Nylon, polyether ether ketone (PEEK) and thermoplastic elastomers (TPEs) such as polyester elastomer, polyurethane elastomer (PU), and polyethylene (PE)-based elastomers.

11. The distributed sensing cable of claim 1 wherein the optical fiber is a single mode optical fiber.

12. The distributed sensing cable of claim 11 wherein the cable comprises a distributed acoustic sensing cable.

13. The distributed sensing cable of claim 1 wherein the optical fiber is a multimode optical fiber.

14. The distributed sensing cable of claim 13 wherein the cable comprises a distributed temperature sensing cable.

15. The distributed sensing cable of claim 1 wherein the optical fiber is a polarization-maintaining optical fiber.

16. The distributed sensing cable of claim 15 wherein the cable comprises a distributed strain sensing cable.

17. The distributed sensing cable of claim 1 wherein the outer jacket exhibits an essentially rectangular profile, including a pair of opposing relatively flat surfaces.

18. The distributed sensing cable of claim 17 wherein the pair of opposing relatively flat surfaces are formed to include a recessed area extending longitudinally along a center portion of the cable.

19. The distributed sensing cable of claim 17 wherein the recessed areas are sized such that a uniform jacket thickness is formed between the opposing recessed areas and the pair of strength member rods.

20. A remote sensing system comprising
   a laser source for emitting a light beam;
   a distributed sensing optical fiber cable for receiving the light beam, the light beam thereafter propagating along a sensing optical fiber within the cable; and
   an optical receiver coupled to the distributed sensing optical fiber cable, wherein
   the distributed sensing optical fiber cable comprises
   an optical fiber including
      a core region;
      at least one cladding layer surrounding the core region;
      a protective coating covering the at least one cladding layer; and
      a tight buffer of elastomeric thermoplastic material disposed to surround the protective coating;
   a pair of strength member rods disposed longitudinally on either side of the optical fiber and spaced apart therefrom, the strength member rods formed of a memory-less material; and
   a plastic jacket formed to encase the optical fiber and encase each strength member rod of the pair of strength member rods, the plastic jacket having a profile including at least one relatively flat surface.

21. The remote sensing system as defined in claim 20 wherein the system comprises a remote strain sensing system and the optical receiver comprises a phase-sensitive Brillouin optical time domain reflectometer (BOTDR).

22. The remote sensing system as defined in claim 20 wherein the system comprises a remote temperature sensing system and the optical receiver comprises a OTDR-Raman system.

23. The remote sensing system as defined in claim 20 wherein the system comprises a remote acoustic sensing system and the optical receiver comprises an Optical Backscatter Reflectometry (OBR) system using Rayleigh-based reflectometry.

* * * * *